United States Patent [19]

Sheehan

[11] Patent Number: 5,781,226
[45] Date of Patent: Jul. 14, 1998

[54] NETWORK VIRTUAL MEMORY FOR A CABLE TELEVISION SETTOP TERMINAL

[75] Inventor: Patrick Sheehan, Jamison, Pa.

[73] Assignee: General Instrument Corporation of Delaware, Hatboro, Pa.

[21] Appl. No.: 554,990

[22] Filed: Nov. 13, 1995

[51] Int. Cl.⁶ ........................................... H04N 7/10
[52] U.S. Cl. ................... 348/6; 348/10; 348/12; 348/13; 455/6.2; 455/6.1; 455/5.1
[58] Field of Search ........................ 348/10, 7, 12, 348/13, 6, 8; 455/6.2, 6.1, 6.3, 5.1, 4.2; H04N 7/16, 7/173

[56] References Cited

U.S. PATENT DOCUMENTS

| | | | |
|---|---|---|---|
| 4,712,239 | 12/1987 | Frezza et al. | 380/20 |
| 4,777,594 | 10/1988 | Jones et al. | 364/200 |
| 4,910,791 | 3/1990 | Dickinson et al. | 455/4 |
| 4,912,552 | 3/1990 | Allison, III et al. | 358/84 |
| 4,972,504 | 11/1990 | Daniel, Jr. et al. | 455/2 |
| 5,020,129 | 5/1991 | Martin et al. | 455/4 |
| 5,301,327 | 4/1994 | McKeeman et al. | 395/70 |
| 5,311,325 | 5/1994 | Edwards et al. | 348/5.5 |
| 5,373,315 | 12/1994 | Dufresne et al. | 348/2 |
| 5,404,505 | 4/1995 | Levinson | 395/600 |
| 5,452,447 | 9/1995 | Nelson et al. | 395/650 |
| 5,539,920 | 7/1996 | Menand et al. | 455/5.1 |
| 5,553,311 | 9/1996 | McLaughlin et al. | 348/10 |
| 5,568,180 | 10/1996 | Okamura | 348/7 |
| 5,586,264 | 12/1996 | Belknap et al. | 395/200.08 |
| 5,592,625 | 1/1997 | Sandberg | 395/200.08 |
| 5,614,940 | 3/1997 | Cobbley et al. | 348/7 |

*Primary Examiner*—John K. Peng
*Assistant Examiner*—Linus H. Lo
*Attorney, Agent, or Firm*—Volpe and Koenig, P.C.

[57] ABSTRACT

The present invention comprises a memory management system employed in a settop terminal which utilizes memory available at the headend of a CATV system through a bidirectional CATV network to augment the memory resident within the settop terminal. The system includes a memory management unit that monitors the software application running on the settop terminal microprocessor, prefetches blocks of the program from the headend and stores these blocks in resident memory. The memory management unit manages the limited pool of settop terminal memory by dividing it into segments large enough to hold a single program block. Program blocks are fetched from the headend as needed by the microprocessor, and segments of memory containing program blocks not likely to be used are reused. The system provides sufficient read-ahead capability to ensure that the microprocessor has enough executable code to process at all times. The location of the memory is completely transparent to the microprocessor.

36 Claims, 9 Drawing Sheets

BLOCK 2600

FETCH BLOCK 2800 FROM THE NETWORK

FETCH BLOCK 2700 FROM THE NETWORK

IF VALUE = 10

THEN WRITE VALUE TO SCREEN

ELSE IF VALUE = 20

THEN STORE VALUE AND GOTO 2800

ELSE GOTO 2700

FIG. 9

NETWORK VIRTUAL MEMORY FOR A CABLE TELEVISION SETTOP TERMINAL

BACKGROUND OF THE INVENTION

1. Field of the Invention

The present invention relates to a virtual memory and a method for a memory management implemented by a cable television settop terminal. More particularly, the invention provides a memory management and address relocation unit which controls data sent to and from a settop terminal and allocates the memory available in the settop terminal based upon the requirements of the application.

2. Description of Related Art

The cable television (CATV) industry is facing revolutionary changes with respect to the types and complexity of services offered. The demand from consumers for CATV services and equipment to support interactive applications has greatly increased in recent years and this trend is expected to continue. Interactive and consumer related software applications generally require a large amount of available random access memory (RAM) within the settop terminal in order to operate on a real time basis. Most of the settop terminals currently in use are unable to support the latest consumer applications since the memory included in older CATV settop terminals is limited. As a result, the CATV industry is faced with the problem of providing fast direct access memory required by increasingly memory intensive software programs which are run on settop terminals.

CATV service providers and their subscribers are accustomed to high volume, low cost hardware or software components. Aside from the cost of the subscription television services, the settop terminal is the major cost in obtaining cable service. Since RAM is an expensive electronic component and contributes an increasingly large portion of the overall cost of the settop terminal, minimizing the amount of RAM is crucial to keeping the cost of the settop terminal reasonable.

Accordingly, there exists a need for an efficient memory management system which minimizes the amount of RAM required in a CATV settop terminal.

SUMMARY OF THE INVENTION

The present invention comprises a memory management system employed in a settop terminal which utilizes memory available at the headend of a CATV system through a bidirectional CATV network to augment the memory resident within the settop terminal. The system includes a memory management unit that monitors the software application running on the settop terminal microprocessor, pre-fetches blocks of the program from the headend and stores these blocks in resident memory. The memory management unit manages the limited pool of settop terminal memory by dividing it into segments large enough to hold a single program block. Program blocks are fetched from the headend as needed by the microprocessor, and segments of memory containing program blocks not likely to be used are reused. The system provides sufficient read-ahead capability to ensure that the microprocessor has enough executable code to process at all times. The location of the memory is completely transparent to the microprocessor.

In an alternative embodiment, a compiler, which generates the code for the settop terminal application, automatically generates the code to facilitate pre-fetching of program blocks by the microprocessor over the network.

Accordingly, it is an object of the present invention to provide a method and apparatus for efficient memory management which controls data access between the microprocessor within a settop terminal and resident and remote memory.

Other objects and advantages of the system will become apparent to those skilled in the art after reading the detailed description of a presently preferred embodiment.

BRIEF DESCRIPTION OF DRAWINGS

FIG. 9 is a flow diagram of the procedure for modifying the executable code.

DETAILED DESCRIPTION OF THE PREFERRED EMBODIMENT

Figure 1:
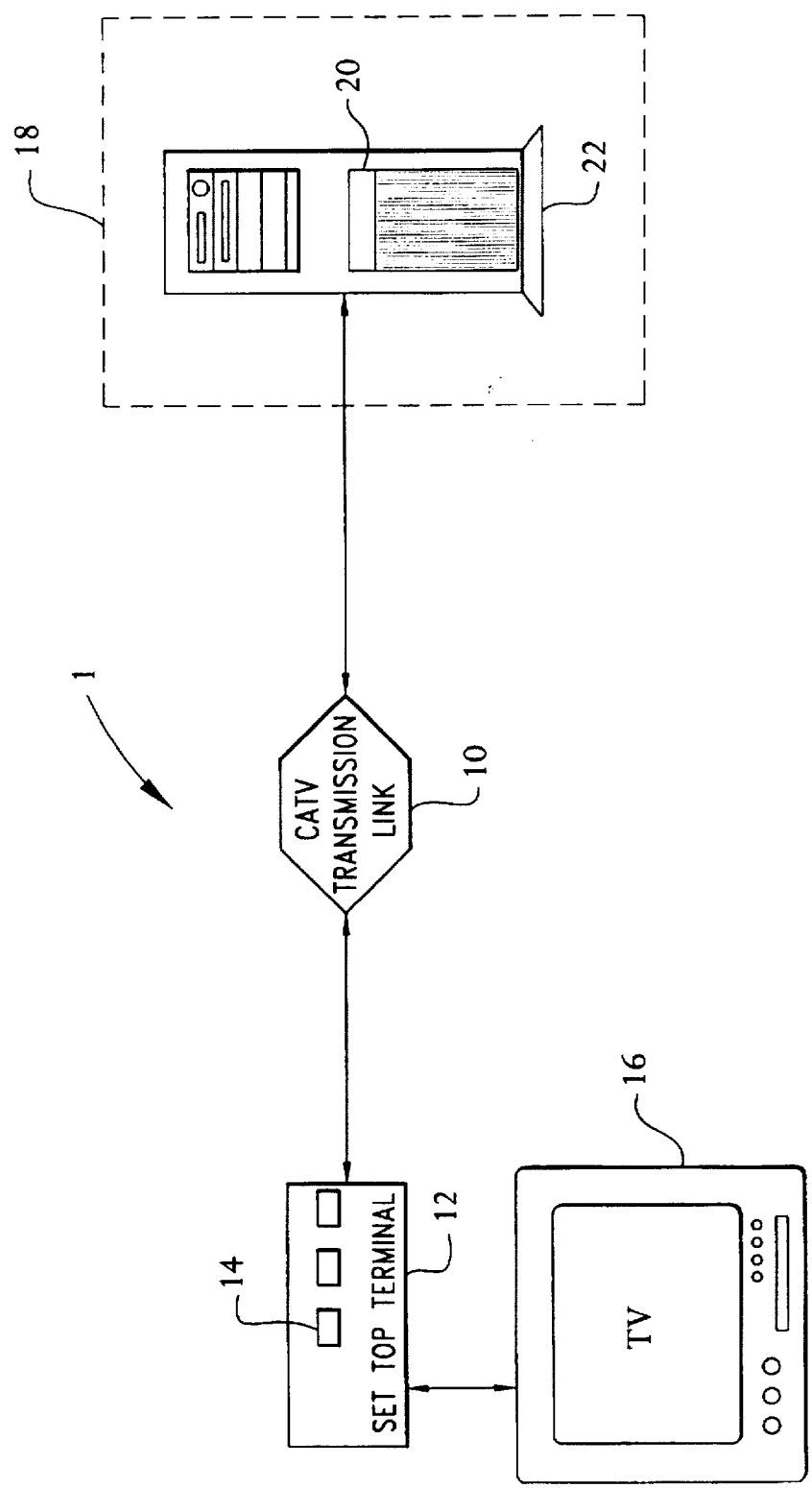
FIG. 1 is a block diagram of a CATV transmission network employing the memory management system of the present invention.

The preferred embodiment will be described with reference to the drawing figures where the numerals represent like elements throughout.

A CATV transmission network 1 employing the memory management system in accordance with the present invention is shown in FIG. 1. The system provides efficient settop terminal memory and data input/output management in an interactive CATV network environment. The transmission network 1 includes a plurality of settop terminals 12, although only one settop terminal 12 is shown for clarity. The settop terminal 12 is coupled to a headend 18 through a high bandwidth CATV transmission link 10. The transmission link 10 includes bi-directional splitters, amplifiers and taps (not shown) which are used in conventional CATV transmission networks. In the preferred embodiment, the transmission link 10 comprises a hybrid fiber-coax (HFC) network. However, a standard coaxial cable network, a fiber optic network or even a "wireless cable" microwave uplink may be utilized.

As with conventional CATV transmissions networks, the CATV network operator provides services to a plurality of subscribers from the headend 18. As is well known by those skilled in the art, the headend 18 includes equipment (not shown) to receive video and/or audio programming from a plurality of off-site sources and transmit the programming over the CATV transmission link 10 on a plurality of specifically assigned broadcast channels. The headend 18 may also locally originate television programs for transmission over broadcast channels. Additionally, system operator messages to be subscribers, video program guides and other data may be transmitted over the transmission link 10. Preferably, this control information is transmitted over a specifically assigned data channel, known as a control data channel (CDC).

In the preferred embodiment, the headend 18 also includes a central computer 22 with associated memory 20. The central computer 22 is the central storage and programming unit for the distributed network of settop terminals 12. The computer 22 contains complete executable computer programs for a plurality of given applications to be accessed and run by settop terminals 12.

Figure 2:
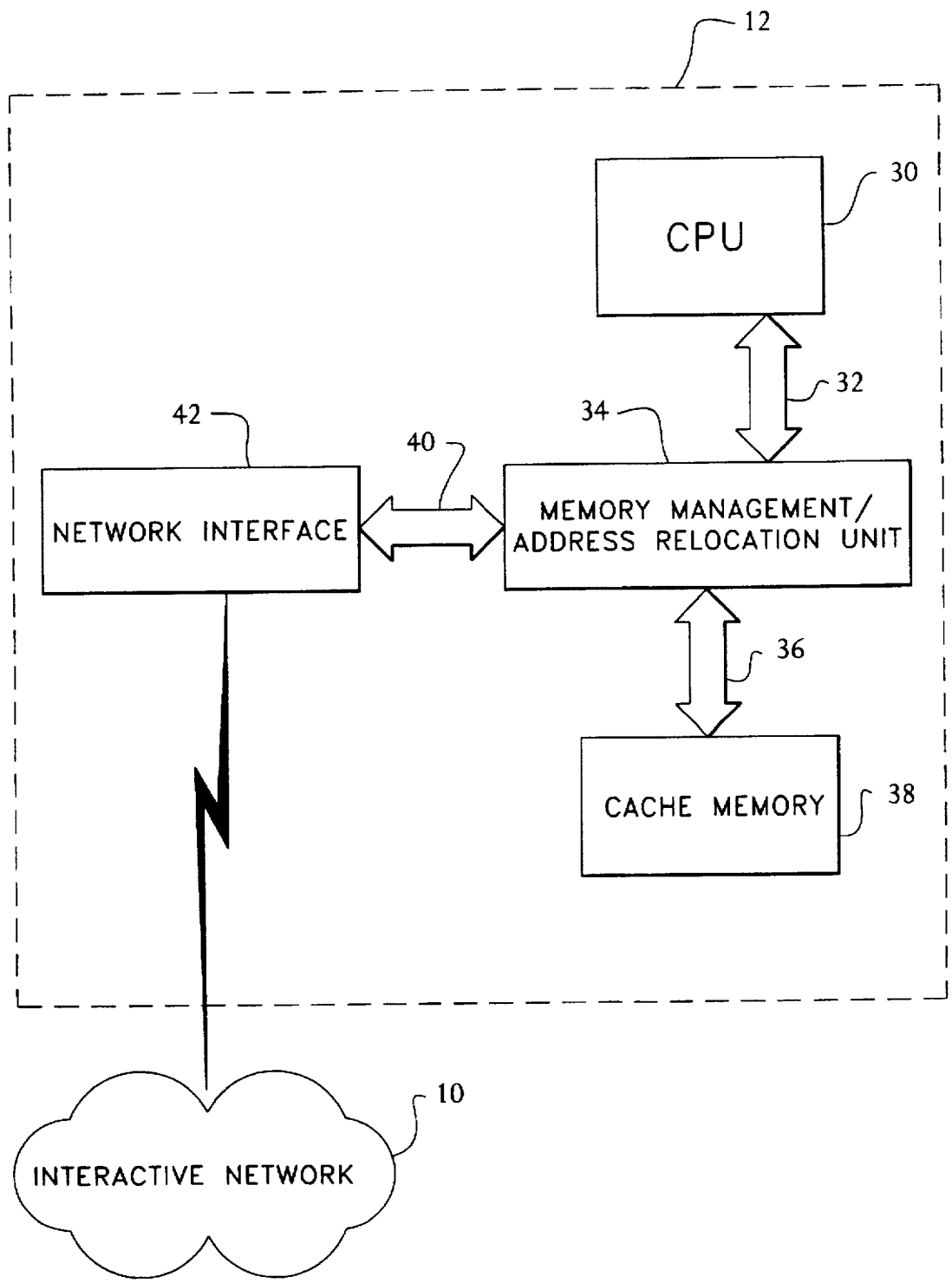
FIG. 2 is a schematic block diagram block diagram of the settop terminal system of the present invention.

Referring to FIG. 2, the settop terminal 12 of the present invention is shown in greater detail. The settop terminal 12 includes a central processing unit (CPU) 30, a memory management/address relocation unit (MMARU) 34, a cache memory 38 and a network interface module 42. The network interface module 42 provides an interface from the settop terminal 12 to the transmission link 10 carrying the services to the subscriber. These links may comprise hybrid fiber coax (HFC), fiber to the curb (FTTC), asynchronous digital subscriber loop (ADSL) and asynchronous transfer mode (ATM). A settop terminal 12 may work with any of these network architectures provided that the network interface module 42 is compatible with the settop terminal 12 on one side and the particular transmission link 10 on the other side. These types of interfaces are well known to those skilled in the art.

The CPU 30 controls the settop terminal 12 and executes the instructions of the software application selected by the subscriber. For example, if the subscriber desires to perform home banking transactions over the network 1, the CPU 30 executes the instructions associated with the banking software program. The CPU 30 is preferably a Motorola MC 68000 series.

If an unlimited amount of memory was available, the banking program would be downloaded into the cache memory 38 and the CPU 30 would fetch instructions as needed from the cache memory 38. However, the high cost of memory places severe restrictions on the amount of memory that can be included within a settop terminal 12. Accordingly, the cache memory 38 included within the settop terminal 12 of the present invention in the preferred embodiment is approximately 128 Kbytes of memory. Most computer applications, particularly interactive and consumer applications, are much larger than 128 Kbytes. Accordingly, these applications would be unable to run on most current settop terminals.

The CPU 30 is linked to the MMARU 34 via a data access path 32. The data access path 32 comprises a parallel bus that permits the MMARU 34 to interface directly with the CPU address bus. As the CPU 30 executes instructions of the selected software program, it accesses additional program instructions as needed from the cache memory 38 via the data access path 32 and the MMARU 34. The MMARU 34 is essentially transparent to the CPU 30.

The MMARU 34 monitors the program blocks being accessed by the CPU 30 from the cache memory 38 and performs a memory virtual address function for the CPU 30. Since the CPU 30 does not know the physical address of a given program block loaded into cache memory 38, the MMARU 34 must translate the logical addresses being presented by the CPU 30 over the data access path 32 to the corresponding physical address within cache memory 38.

A pool of program blocks reside in the cache memory 38. The MMARU 34 manages the pool of program blocks in the cache memory 38 by replacing the least recently used program block with a more urgently needed program block. The cache memory 38 holds the most recently or more frequently used memory blocks, so that subsequent access to those memory blocks can be performed without having to access the headend 18. The most frequently used information would receive the highest priority and the least frequently used information would receive the lowest priority. If additional information is required to be stored within the high-speed cache memory 38 and space is not available, the least frequently used information presently within the cache memory 38 would be erased and/or overwritten. It should be understood that direct cache accesses require significantly less processing time than network accesses.

Figure 3:
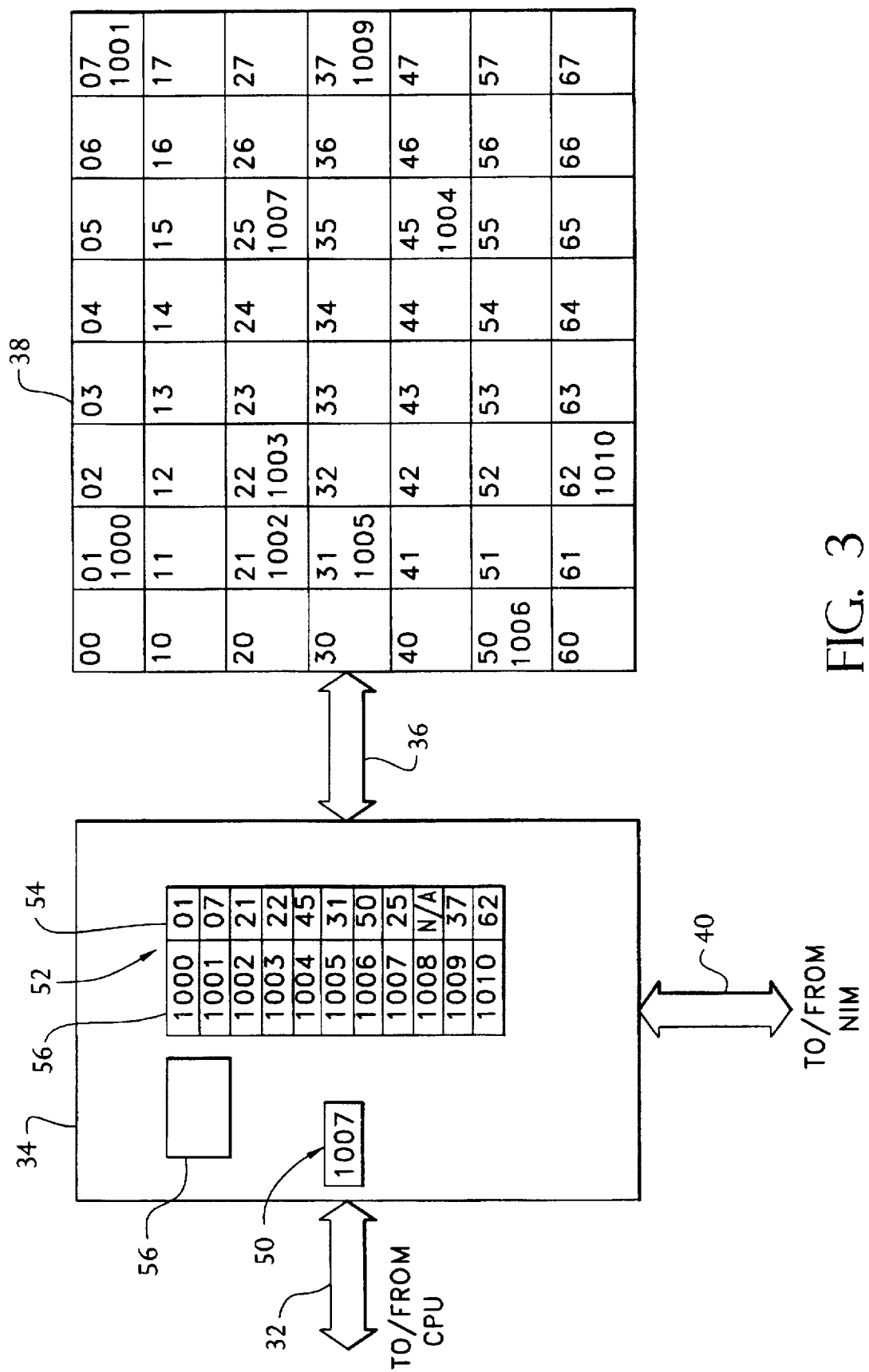
FIG. 3 is a schematic block diagram of the memory management/address relocation unit of the present invention (MMARU)

The process of translating the logical addresses into the physical addresses (i.e. a virtual address function) begins when the CPU 30 provides the MMARU 34 with a logical address of a desired program block. As shown in FIG. 3, the logical address is temporarily stored in a buffer 50. The MMARU 34 includes a map RAM 52 having a plurality of storage locations for logical addresses 56 and memory physical addresses 54. Each memory physical address 54 corresponds to, and is addressable by, a logical address 56. In the preferred embodiment, the memory addresses are 32-bit addresses. Those skilled in the art would appreciate that 64-bit addresses or larger could be used depending upon the requirements of the system.

When the MMARU 34 detects a new logical address in the buffer 50, the MMARU 34 accesses the logical address in the map RAM 52. The logical address 56 will have a corresponding memory physical address 54 which will then be accessed by the MMARU 34 and forwarded to the CPU 30. For example, as shown in FIG. 3, the CPU 30 has requested the program block of logical address 1007. The MMARU 34 accesses the map RAM 52 and looks for logical address number 1007. In the example, this corresponds to memory physical address number 25. Accordingly, the MMARU 34 will access cache memory 38 location number 25 and forward program block 1007 to the CPU 30. As a second example, if the CPU 30 requests the program block in logical address number 1008, the MMARU 34 determines that this program block is not stored in cache memory 38. As will be described in greater detail hereinafter, the MMARU 34 immediately accesses this program block from the headend 18 via the network interface module 42. Program block number 1008 would be stored in one of the locations within cache memory 38, the map RAM 52 would be updated and program block 1008 would be forwarded to the CPU 30 for processing. Once the translation is performed, the MMARU 34 retrieves from the corresponding physical address the program blocks requested by the CPU 30.

Figure 4:
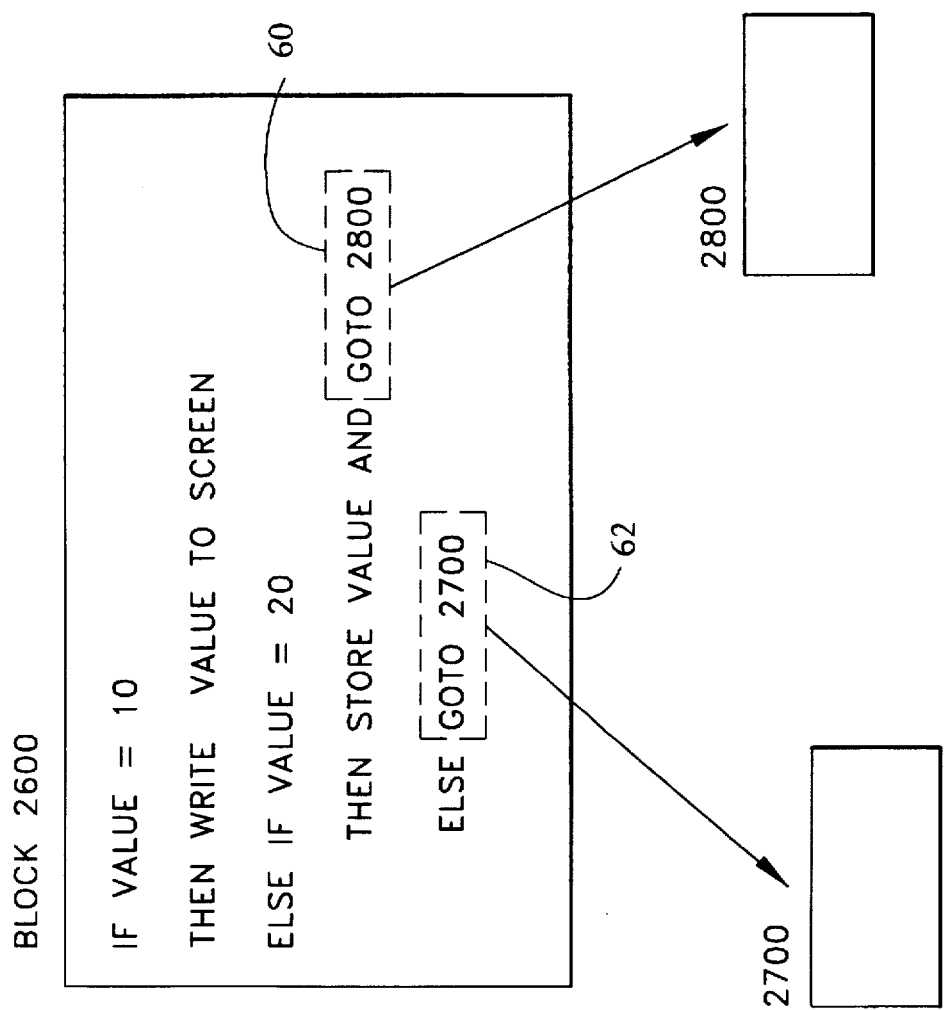
FIG. 4 is a block diagram of a currently executing program block.

In addition to providing the virtual address function, the MMARU 280 performs a "look ahead" function by scanning the currently executing program block for branch instructions. Referring to FIG. 4, the currently executing program block is 2600, which includes two branch instructions, as shown by dashed blocks 60, 62. As the current program block 2600 is accessed, the MMARU 34 scans the program block 2600 and locates "calls" shown by dashed blocks 62, 60 to other program blocks 2700, 2800 respectively. The call references are then traced and retrieved. For example, if program block 2600 is currently executing and includes a routine which branches to block 2800, then the MMARU 34 will pre-fetch blocks 2700 and 2800 and place the blocks 2700 and 2800 into cache memory 38. The CPU 30 will then be able to immediately access blocks 2700, 2800 without having to wait for the blocks to be accessed from the headend 18 via the transmission link 10. The same process will be performed with other program blocks as they are executed by the CPU 30. Those skilled in the art will appreciate that fewer headend 18 accesses results in expedited program performance, as the MMARU 34 will be able to fetch the necessary program blocks from the faster cache memory 38 on demand from the CPU 30.

Figure 5:
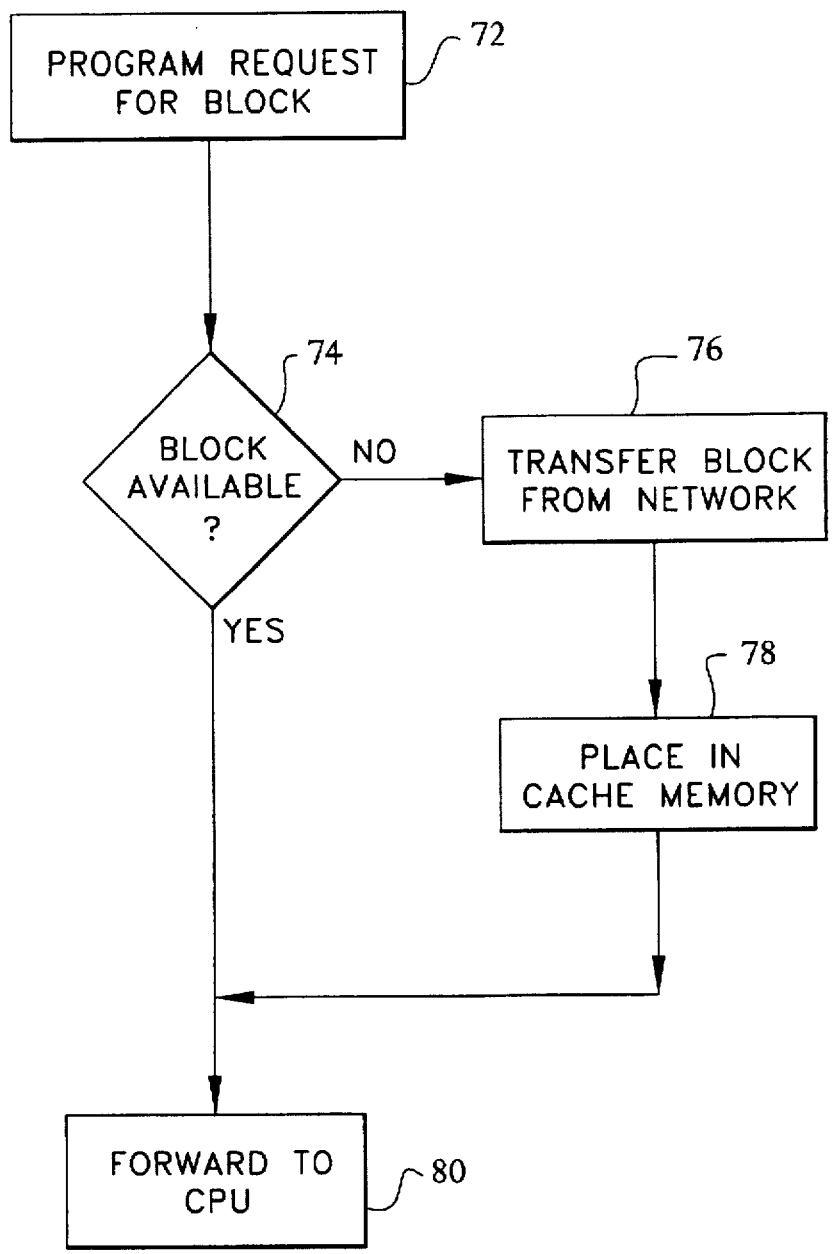
FIG. 5 is a flow diagram of the pre-fetching process used by the MMARU.

The MMARU 34 determines that additional blocks of code are required from the headend 18 using the process shown in FIG. 5. As previously described, the program blocks requested by the CPU 32 may or may not be available from the cache memory 38. The MMARU 34 uses a hardware or micro-coded engine 56 to determine when program blocks must be fetched from the cache memory 38 or the headend 18. In the preferred embodiment, the microcoded engine 56 is a state machine constructed from a field programmable gate array (FPGA) such as the Altara 7192. The process of fetching instructions from the cache memory 38 on the headend 18 is completely transparent to the CPU 30.

As illustrated in FIG. 5, the MMARU 38 receives a request for a program block (step 72) from the CPU 30. The MMARU 34 then determines (step 74) whether the requested program block is available in cache memory 38. When the requested program block is not available, the MMARU 34 sends a program block request to the network interface module 42 (step 76) which initiates transfer of the required program block from the headend 18. The newly accessed program block is then placed in cache memory 38 (step 78).

Figure 6:
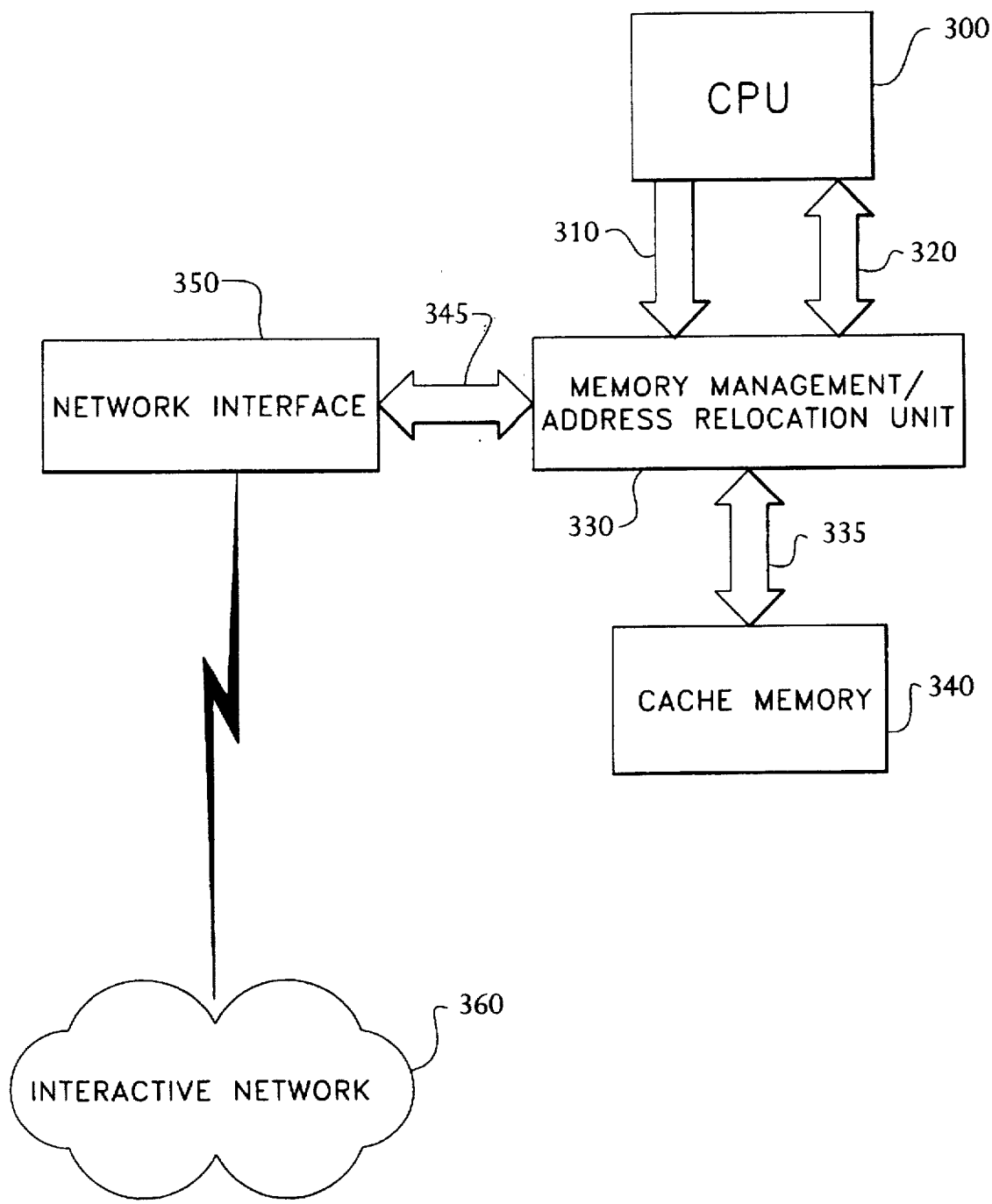
FIG. 6 is a schematic block diagram of an alternative embodiment of the virtual memory system.

Referring to FIG. 6, an alternative embodiment of the present invention is shown which utilizes two data paths between the CPU 300 and the MMARU 330; a control channel path 310 and an instruction and data access path 320. The MMARU 330 in this embodiment performs the same memory relocation function as in the preferred embodiment. However, the MMARU 330 does not analyze the program being run by the CPU 300 since the software programs run on the CPU 300 are linked using a special linker software program in accordance with the present invention as shown in FIG. 7.

Figure 7:
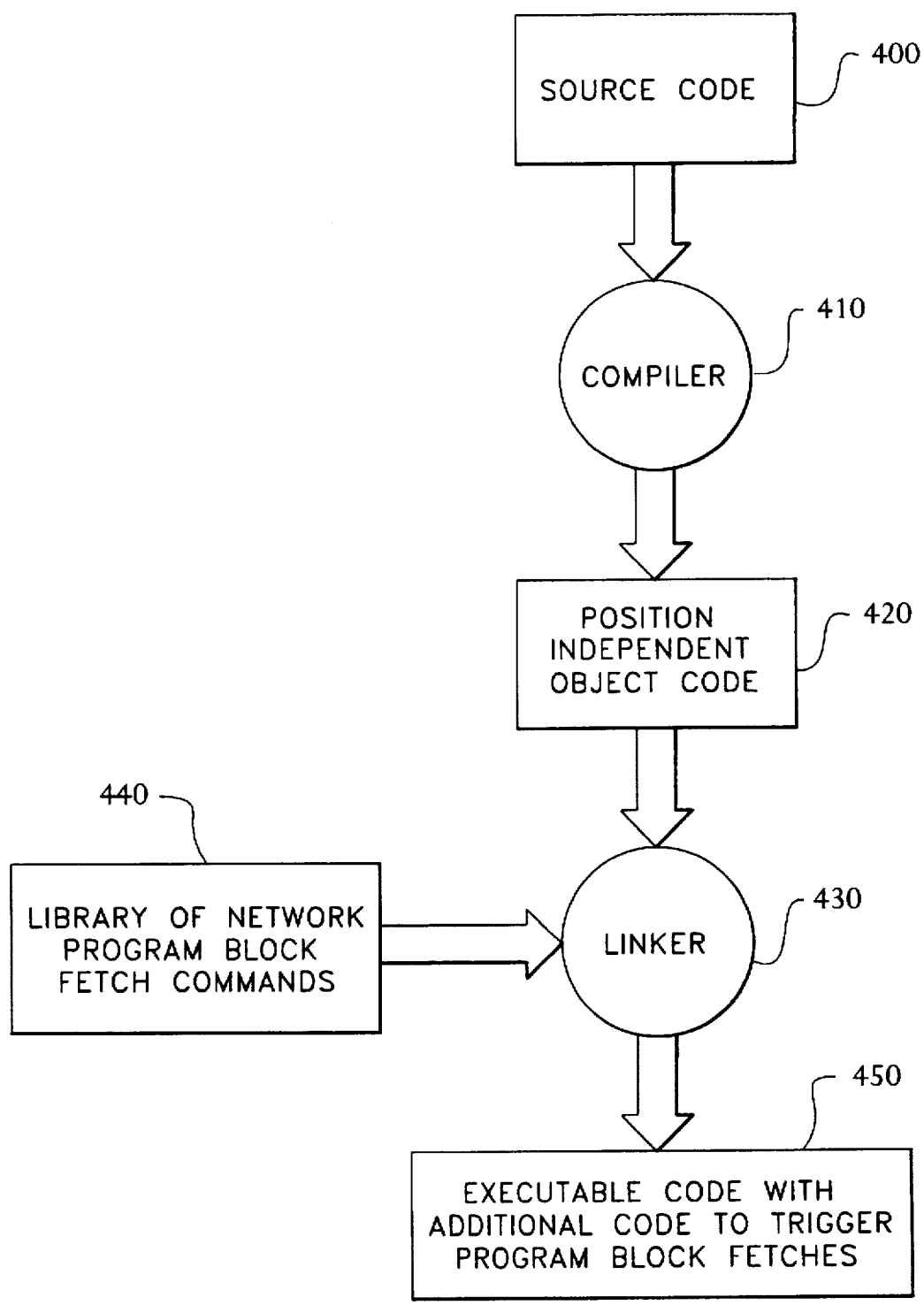
FIG. 7 is a flow diagram of the compiling and linking process in accordance with the alternative embodiment.

Referring to FIG. 7, a program to be executed by the CPU 300 of the present invention begins as source code 400. After the source code 400 is compiled 410, a position independent object code 420 is obtained. The software linker 430 then inserts specific "block fetch commands" 440 into the executable code. These commands 440, when executed by the CPU 300, enable the CPU 300 to directly send commands over the control channel 310 to the MMARU 330 to fetch a new block of memory via the network interface 350.

Figure 8:
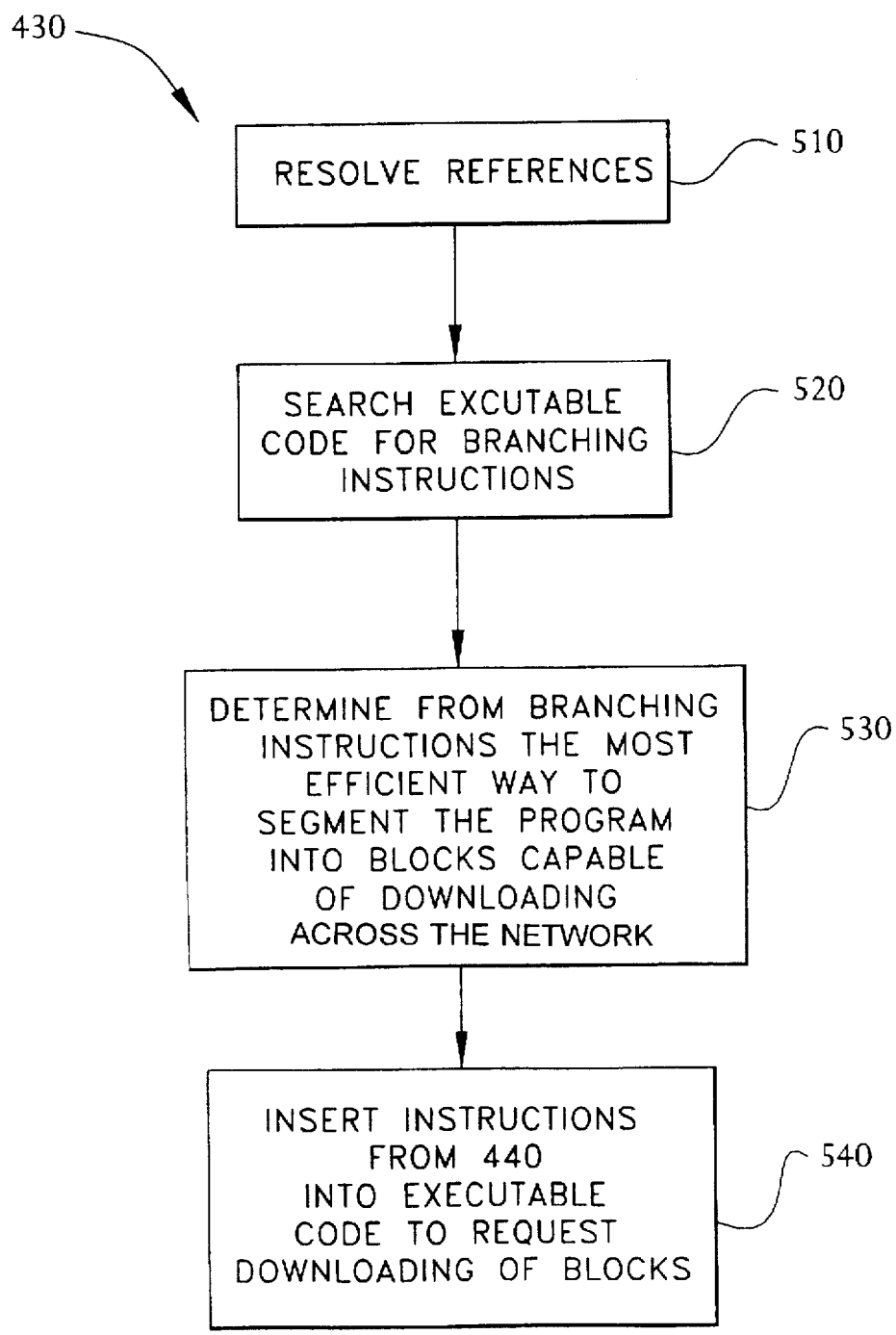
FIG. 8 is a flow diagram of the procedure for creating an executable program in accordance with the alternative embodiment.

FIG. 8 shows the procedure for creating an executable program in greater detail in conjunction with the embodiment shown in FIG. 6. The source level code 400 is compiled using a compiler 410 capable of generating position independent object code 420. Typically, the source level code is written in a high level language (for example the "C" programming language). The C source code is then translated into the object code which can be understood, and run, by the CPU 300. This object code 420 is then processed by the linker program 430.

As shown in FIG. 8, the linker 430 performs the following tasks: 1) resolve references (step 510) between individually compiled objects; 2) search the executable object code (step 520) for branching instructions; 3) determine from the branching instructions (step 530) the most efficient way to segment the program into blocks capable of being downloaded across the network; and 4) insert instructions (step 540) from the Library of Network Program Block Fetch Commands 440 (step 540) into the executable code to request the downloading of blocks, at the appropriate time, using the control channel 310 to the MMARU 330 shown in FIG. 6.

The linker 430 modifies the executable code so that the execution of the code by the CPU 300 is not interrupted while waiting for a block of code to be accessed from the headend 18. For example, if the source code for a given application were that shown in FIG. 4 as block 2600, the linker 430 would modify the executable code as shown in FIG. 9. In this example, the code to fetch blocks 2700 and 2800 would be inserted by the linker 430 during the processing of the code by the linker 430. When the linker 430 determines that the code in blocks 2700 and 2800 might be called during execution, the block fetch instructions are inserted early enough into the execution sequence to allow time for the blocks to be accessed, received and stored in cache memory 340 before they are needed by the CPU 300 for execution.

The linker 430 resolves references by tabulating the calls within the object code. Since the linker 430 receives the output of the compiler 410, the linker 430 operates on the object code in machine language. Accordingly, the object code is scanned for the machine language equivalent of any type of branching instructions such as "GOTO", "GOSUB", "CALLS" or lookup tables. The linker 430 then joins the object code with the required branched routines. The compiled code is segmented into downloadable blocks. Segmenting creates blocks of code which are sized to fit within the cache memory 340. Although the blocks are preferably segmented in equally sized blocks, each block may be of a different size.

The settop terminal 12 in the CATV transmission network 1 acts as the hub for a variety of subscriber and program information. The program blocks may be interleaved with other settop terminal data. There are several ways the blocks of program data may be distinguished and interleaved with other types of data being sent to the settop terminal. When the MPEG2 standard is being used, a private data stream may be used with a unique program identification (PID) for transferring executable data blocks. Alternatively, where data communication protocols that support virtual circuits or virtual channels are in use (e.g. ATM, and X.25) the network interface may be used to dedicate a virtual channel to the transmission of program block data. Depending on the type of physical network utilized, there may be a different protocol. The present invention may take advantage of any standard data communication protocol to deliver the executable blocks of data.

It will be appreciated by those skilled in the art that the present invention is particularly suited for use with interactive applications such as interactive games, home banking and home shopping. As the software programs for these applications becomes more complex, and thus more memory intensive, the settop terminal hardware will no longer be a limiting factor for the CATV network operator to provide new and expanding services and features.

While the present invention has been described in terms of the preferred embodiment, other variations which are within the scope of the invention as defined in the claims will be apparent to those skilled in the art.

What is claimed is:

1. A settop terminal for use in a cable TV (CATV) system, having a headend and a plurality of settop terminals, said terminal including:

cable input means for receiving a CATV signal which includes both TV programming signals and interactive application programming data and instructions;

a CPU processing interactive application programs;

a local cache memory;

a network interface module providing access to a remote memory in the headend via a data transmission link; and a memory management/address relocation unit (MMARU), including:

means for receiving a program block request from said CPU;

means for determining whether said requested program block is stored within said cache memory;

means for accessing said requested program block stored in said cache memory;

means for monitoring said accessed program block; and means for fetching new program blocks from said remote memory in said headend; said fetching means is responsive to said determining means when said requested program block is not stored in said cache memory.

2. The settop terminal of claim 1 wherein said program block request includes a logical address and wherein said MMARU further includes means for translating said logical address to a corresponding physical memory address within said cache memory.

3. The settop terminal of claim 2 wherein said translating means further includes means for storing a map of the logical addresses and corresponding physical addresses of the program blocks stored in said cache memory.

4. The settop terminal of claim 1 wherein said MMARU further includes means for storing urgently needed program blocks by overwriting less frequently used program blocks in said cache memory.

5. The settop terminal of claim 3 wherein said determining means searches said map to determine whether said requested program block is stored within said cache memory.

6. The settop terminal of claim 1 wherein said monitoring means further includes means for locating branch instructions within said accessed program block.

7. The settop terminal of claim 6 wherein each said branch instruction references a program block other than said accessed program block, and wherein said determining means determines whether said referenced program block is stored in cache memory.

8. The settop terminal of claim 7 wherein said fetching means is responsive to said determining means when said referenced program block is not stored in said cache memory.

9. A method of providing a virtual memory system in a settop terminal for use in an interactive network comprising the steps of:

requesting a program block from a cache memory, each block including a logical address;

translating the logical address of said requested program block to a corresponding physical address of the program block stored within said cache memory;

determining whether said requested program block is stored within said cache memory;

accessing said requested program block stored in said cache memory;

fetching a new program block from a remote memory over said interactive network when said requested program block is not stored in said cache memory; and storing said new program block in said cache memory.

10. The method of claim 9 further including storing a map of the logical addresses and corresponding physical addresses of the program blocks stored in said cache memory.

11. The method of claim 9 further including storing new program blocks in cache memory by overwriting less frequently used program blocks.

12. The method of claim 10 further including searching said map to determine whether said requested program block is stored within said cache memory.

13. The method of claim 9 further including locating branch instructions within said accessed program block, wherein each said branch instruction references a program block other than said accessed program block.

14. The method of claim 13 further including determining whether said referenced program block is stored within said cache memory.

15. The method of claim 14 further including fetching new program blocks from said remote memory when said referenced program block is not stored within said cache memory.

16. A settop terminal for use in a cable TV (CATV) system, having a headend and a plurality of settop terminals, including:

cable input means for receiving a CATV signal which includes both TV programming signals and interactive application programming data and instructions;

a local cache memory;

a network interface module providing access to a remote memory located at the headend via a data transmission link;

a data bus providing access to said cache memory;

a CPU processing interactive application programs, each program comprising a plurality of program blocks; and, a memory management/address relocation unit (MMARU) including:

means for determining whether a particular program block is stored within said cache memory;

means for pre-fetching new program blocks, prior to being required by said CPU, from said remote memory and storing said pre-fetched blocks in said cache memory when said particular program block is not stored within said cache memory; and means for accessing said program blocks stored in said cache memory when required by said CPU.

17. The settop terminal of claim 16 wherein said program block request includes a logical address and wherein said MMARU further includes means for translating said logical address to a corresponding physical memory address within said cache memory.

18. The settop terminal of claim 17 wherein said translating means further includes means for storing a map of the logical addresses and corresponding physical addresses of the program blocks stored in said cache memory.

19. The settop terminal of claim 1 wherein said MMARU further includes means for storing, in cache memory, new program blocks fetched by said CPU by overwriting less frequently used program blocks.

20. The settop terminal of claim 16 wherein each program block currently processed by said CPU includes instructions for fetching new program blocks from said remote memory.

21. A method for providing a code with program block fetch commands for execution by a microprocessor in a settop terminal of a cable TV system comprising:

providing a source code;

compiling said source code to obtain a position independent object code;

linking said position independent object code with a library of network program block fetch commands, whereby said fetch commands are inserted into said object code, said commands enabling said microprocessor to pre-fetch a required program block from a memory in a headend of said cable TV system prior to said program block being executed by said microprocessor.

22. The method of claim 21 further including segmenting said linked code into a plurality of code blocks of a predetermined size.

23. The method of claim 22 wherein said code block size is 128 Kbytes.

24. A cable TV (CATV) system including a headend and a plurality of settop terminals including:
   a headend comprising:
      a computer controlling operation of the CATV system; and
      a memory unit providing storage of interactive applications for the CATV system; and
   a plurality of settop terminals, each terminal comprising:
      cable input means for receiving a CATV signal which includes both TV programming signals and interactive application programming data and instructions;
      a CPU processing interactive application programs;
      a local cache memory;
      a network interface module providing access to said headend memory via a data transmission link; and
      a memory management/address relocation unit (MMARU), including:
         means for receiving a program block request from said CPU;
         means for determining whether said requested program block is stored within said cache memory;
         means for accessing said requested program block stored in said cache memory;
         means for monitoring said accessed program block; and
         means for fetching new program blocks from said headend memory; said fetching means is responsive to said determining means when said requested program block is not stored in said cache memory.

25. The system of claim 24 wherein said program block request includes a logical address and wherein said MMARU further includes means for translating said logical address to a corresponding physical memory address within said cache memory.

26. The system of claim 25 wherein said translating means further includes means for storing a map of the logical addresses and corresponding physical addresses of the program blocks stored in said cache memory.

27. The system of claim 24 wherein said MMARU further includes means for storing urgently needed program blocks by overwriting less frequently used program blocks.

28. The system of claim 26 wherein said determining means searches said map to determine whether said requested program block is stored within said cache memory.

29. The system of claim 24 wherein said monitoring means further includes means for locating branch instructions within said accessed program block.

30. The system of claim 29 wherein each said branch instruction references a program block other than said accessed program block, and wherein said determining means determines whether said referenced program block is stored in cache memory.

31. The system of claim 30 wherein said fetching means is responsive to said determining means when said referenced program block is not stored in said cache memory.

32. The system of claim 24 wherein said computer receives program block requests from said network interface module, accesses the requested program block from said memory unit and transmits the requested program block via the CATV system.

33. A settop terminal for use in a cable television (CATV) system, having a headend and a plurality of settop terminals, said terminal comprising:
   means for receiving a CATV signal which includes both TV programming signals and interactive application programming data and instructions;
   a CPU processing interactive application programs;
   a local cache memory; and
   a memory management/address relocation unit (MMARU), including:
      means for receiving a program block request from said CPU;
      means for determining whether said requested program block is stored within said cache memory;
      means for accessing said requested program block stored in said cache memory; and
      means for fetching new program blocks from a remote memory in said headend when said determining means determines that said requested program block is not stored in said cache memory.

34. A settop terminal for use in a cable television (CATV) system, having a headend and a plurality of settop terminals, said settop terminals comprising:
   an executable code;
   a software linker inserting block fetch commands into the executable code;
   a network interface;
   a memory management/address relocation unit (MMARU); and
   a central processing unit (CPU) executing said executable code, which includes transmitting commands to the MMARU to fetch blocks of data from a remote memory in the headend by way of the network interface or to fetch blocks of data directly from a cache.

35. The settop terminal of claim 34 wherein said software linker searches the executable code for branching instructions; determines from the branching instructions the most efficient way to segment the executable code into blocks capable of being downloaded from the headend, and inserts instructions from a library of network program block fetch commands into the executable code to request the downloading of blocks from the headend when required by the CPU.

36. A method of providing a virtual memory system in a settop terminal, including a central processing unit (CPU), a memory management/address relocation unit (MMARU), remote memory, a software linker, a library of program block fetch commands, and a cache memory, for use in an interactive network comprising the steps of:
   providing a source code;
   compiling a source code to provide an executable code;
   searching the executable code for branching instructions;
   determining from the branching instructions the most efficient manner of segmenting the executable code into blocks capable of being downloaded across said interactive network;
   inserting instructions from said library of network program block fetch commands into the executable code to request the downloading of blocks when required from the MMARU; and executing the executable code, which comprises the steps of:

requesting a program block from a cache memory, each block including a logical address;

translating the logical address of said requested program block to a corresponding physical address of the program block stored within said cache memory;

determining whether said requested program block is stored within said cache memory;

accessing said requested program block stored in said cache memory;

fetching a new program block from said remote memory when said requested program block is not stored in said cache memory; and storing said new program block in cache memory.

* * * * *